United States Patent
Yang et al.

(10) Patent No.: US 8,915,708 B2
(45) Date of Patent: Dec. 23, 2014

(54) TURBOCHARGER WITH AIR BUFFER SEAL

(75) Inventors: Nan Yang, Dunlap, IL (US); Jeff A. Jensen, Dunlap, IL (US); Robert C. Griffith, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 707 days.

(21) Appl. No.: 13/168,178

(22) Filed: Jun. 24, 2011

(65) Prior Publication Data

US 2012/0328418 A1 Dec. 27, 2012

(51) Int. Cl.
| F01D 25/16 | (2006.01) |
| F01D 25/18 | (2006.01) |
| F16C 33/76 | (2006.01) |
| F16J 15/40 | (2006.01) |
| F16C 19/18 | (2006.01) |

(52) U.S. Cl.
CPC .......... *F01D 25/186* (2013.01); *F05D 2220/40* (2013.01); *F16C 33/762* (2013.01); *F16C 19/184* (2013.01); *F16J 15/40* (2013.01); *F16C 2360/24* (2013.01)
USPC ............ 415/229; 415/111; 415/112; 416/174

(58) Field of Classification Search
USPC ........ 415/110, 111, 112, 170.1, 229; 416/174
See application file for complete search history.

(56) References Cited

U.S. PATENT DOCUMENTS

| 3,825,311 A | * | 7/1974 | Murray | 384/144 |
| RE30,333 E | * | 7/1980 | Gordon et al. | 60/605.1 |
| 4,472,107 A | * | 9/1984 | Chang et al. | 415/104 |
| 4,752,193 A | * | 6/1988 | Horler | 417/407 |
| 5,076,765 A | * | 12/1991 | Yagi et al. | 417/407 |
| 5,156,522 A | * | 10/1992 | Tessier | 415/58.2 |
| 5,163,294 A | | 11/1992 | Shirai | |
| 5,393,356 A | | 2/1995 | Singheiser | |
| 5,503,798 A | | 4/1996 | Singheiser et al. | |
| 5,890,881 A | * | 4/1999 | Adeff | 417/407 |
| 6,877,317 B2 | | 4/2005 | Kurihara et al. | |
| 2005/0188694 A1 | | 9/2005 | Frankenstein | |
| 2008/0031750 A1 | | 2/2008 | Gomilar et al. | |
| 2010/0037855 A1 | | 2/2010 | French | |
| 2012/0328418 A1 | * | 12/2012 | Yang et al. | 415/170.1 |

FOREIGN PATENT DOCUMENTS

| DE | 41 41 159 C1 | 4/1993 |
| DE | 43 04 481 A1 | 8/1994 |
| DE | 10 2008 052 321 A1 | 4/2010 |
| EP | 0357246 B1 * | 10/1995 |
| GB | 1 345 304 A | 1/1974 |
| WO | 2004-063535 A1 | 7/2004 |
| WO | WO 2004063535 A1 * | 7/2004 |

* cited by examiner

*Primary Examiner* — Edward Look
*Assistant Examiner* — Christopher R Legendre
(74) *Attorney, Agent, or Firm* — Leydig, Voit & Mayer, Ltd.

(57) ABSTRACT

A turbocharger includes a turbine section, a compressor section and a bearing section. A turbine wheel and a compressor wheel are mounted on a shaft and the shaft is rotatably mounted in a bore of a housing. A lubrication system circulates lubricant through the bearing section. First and second spaced apart seals are positioned along the shaft. A recess is positioned between the first seal and the second seal to define an air buffer chamber. The air buffer chamber is provided with pressurized air to discourage lubricant leakage past the first seal.

17 Claims, 3 Drawing Sheets

TURBOCHARGER WITH AIR BUFFER SEAL

TECHNICAL FIELD

This disclosure relates generally to a turbocharger for use with an internal combustion engine and, more particularly, to an air buffer seal for use with a turbocharger.

BACKGROUND

Internal combustion engines often include one or more turbochargers for compressing a fluid such as air, which is then supplied to combustion cylinders or chambers of the engine. Exhaust gases are directed to and drive a turbine wheel of the turbocharger. The turbine wheel is connected to a shaft that drives a compressor wheel. Ambient air is compressed by the compressor and fed into the intake manifold of the engine.

The shaft of the turbocharger is typically supported between the turbine wheel and the compressor wheel by one or more bearings contained within a bearing housing. Oil lubricates the bearings. Seals prevent oil from leaking from the bearing housing. Oil from the bearing housing leaking past the seal at the turbine end of the bearing housing may undesirably mix with the exhaust flow. Oil from the bearing housing leaking past the seal at the compressor end of the bearing housing may be undesirably carried into the combustion chamber of the engine. In addition, if exhaust gases leak past the seal between the bearing housing and the turbine housing, the exhaust gasses may contaminate the oil and reduce its lubrication and cooling capabilities.

U.S. Pat. No. 7,334,799 discloses a turbocharger for use with an internal combustion engine. The turbocharger includes a turbine and a two-stage compressor. A sealing device having a ring seal and a bellows assembly is provided to create a seal between the bearing housing and the turbine. Pressure differential between the bearing housing and the turbine causes expansion and contraction of the bellows assembly in order to improve the sealing function.

The foregoing background discussion is intended solely to aid the reader. It is not intended to limit the innovations described herein nor to limit or expand the prior art discussed. Thus, the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

In one aspect, a turbocharger for an internal combustion engine is provided. The turbocharger includes a turbine section with a turbine wheel, a compressor section with a compressor wheel and a bearing section. The turbine wheel and the compressor wheel are mounted on a shaft and the shaft is rotatably mounted in a bore of a housing. The bearing section has a bearing chamber with a bearing assembly that rotatably supports the shaft. A lubrication system includes a lubricant or oil passage for circulating a lubricant such as oil within the bearing chamber and to the bearing assembly. A first seal is positioned along the shaft adjacent a side of the bearing chamber and a second seal is positioned along the shaft and spaced from the first seal. A recess defined between the first seal and the second seal creates an air buffer chamber. The air buffer chamber is in fluid communication with an air supply to provide the air buffer chamber with a supply of pressurized air to create a pressure differential between the bearing chamber and the air buffer chamber that reduces lubricant leakage past the first seal.

In another aspect, a turbocharger includes a turbine section with a turbine wheel, a compressor section with a compressor wheel and a bearing section. The turbine wheel and the compressor wheel are mounted on a shaft. The shaft is rotatably mounted in a bore of a housing. The bearing section has a bearing chamber with a bearing assembly that rotatably supports the shaft. A lubrication system includes a lubricant or oil passage for circulating a lubricant such as oil within the bearing chamber and to the bearing assembly. The shaft includes a remote end with a remote bearing chamber positioned adjacent the remote end of the shaft such that the compressor wheel is disposed between the bearing chamber and the remote end of the shaft. The remote bearing chamber has a remote bearing assembly rotatably supporting the remote end of the shaft. A remote lubrication system includes a remote passage for circulating a lubricant such as oil within the remote bearing chamber to the remote bearing assembly. A first remote seal is positioned along the shaft adjacent a side of the remote bearing chamber. A second remote seal is positioned along the shaft and spaced from the first seal. A remote recess is positioned between the first remote seal and the second remote seal to define a remote air buffer chamber. The remote air buffer chamber is in fluid communication with an air supply to provide the remote air buffer chamber with a supply of pressurized air to create a pressure differential between the remote bearing chamber and the remote air buffer chamber to reduce lubricant leakage past the first remote seal. The air buffer chamber may also be implemented with other forced induction systems such as a supercharger.

DETAILED DESCRIPTION

Figure 1:
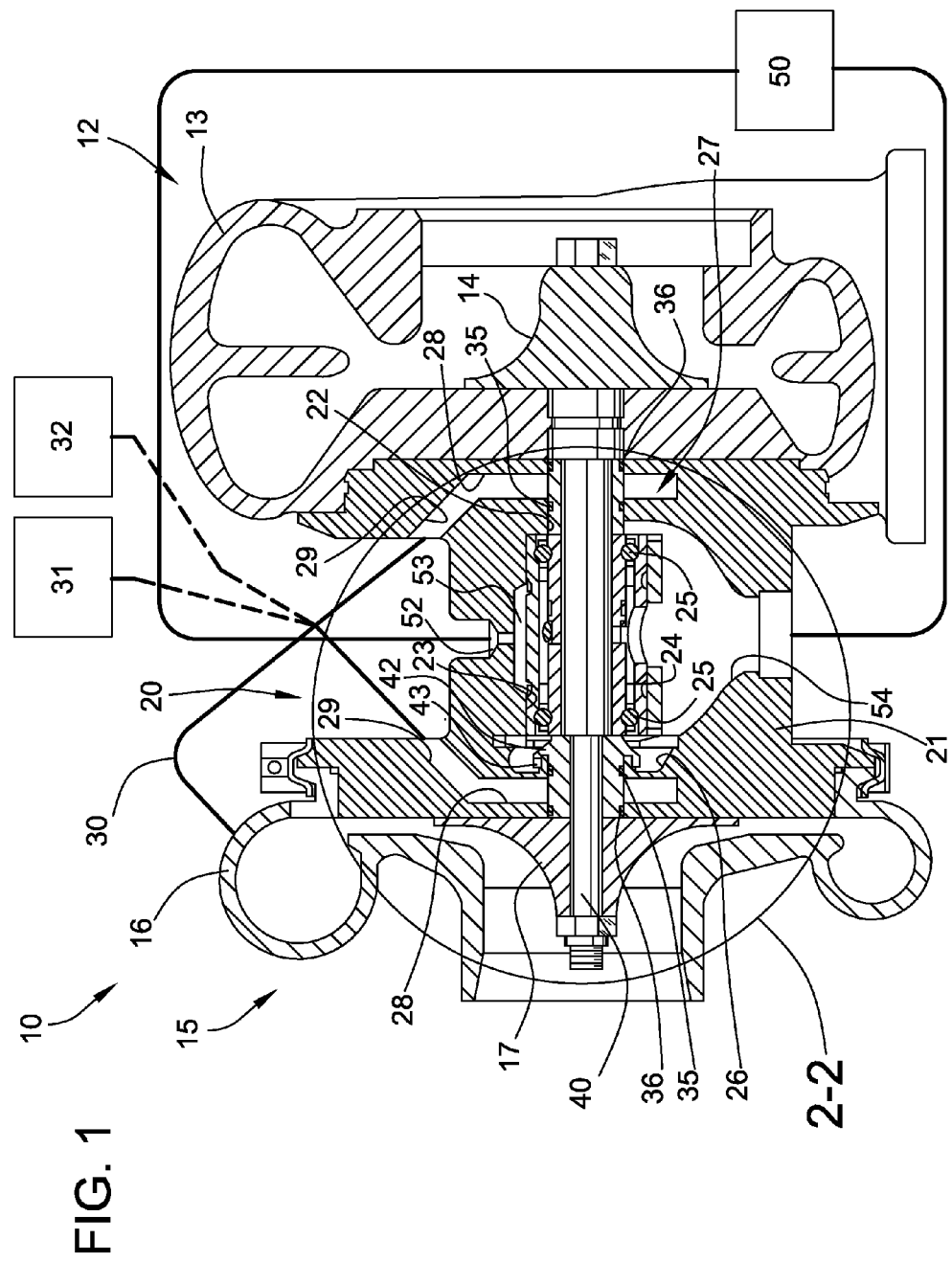
FIG. 1 is a first embodiment of a turbocharger, partially in section, in accordance with the disclosure.
Figure 2:
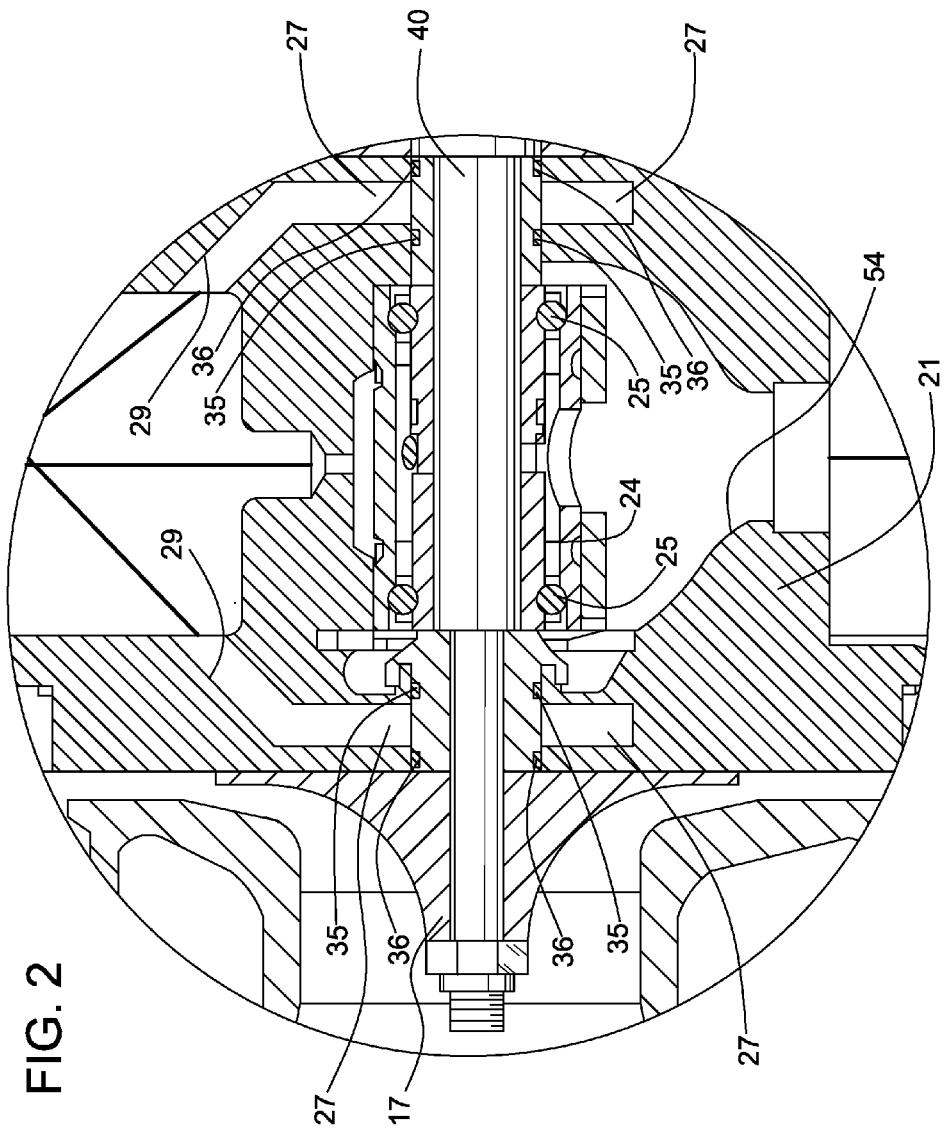
FIG. 2 is an enlarged view of the encircled portion 2-2 of the turbocharger of FIG. 1.

A forced induction system in the form of a turbocharger assembly is generally shown at 10 in FIGS. 1-2. The turbocharger assembly includes a turbine section 12, a compressor section 15 and a central bearing section 20 secured between and to the turbine section 12 and the compressor section 15. Turbine section 12 includes a turbine housing 13 with a turbine wheel 14 positioned within the turbine housing and mounted on shaft 40. The turbine housing 13 and turbine wheel 14 define a portion of an exhaust flow path through which exhaust gas enters the turbine and rotates shaft 40. Shaft 40 extends through central bore 22 in central bearing section 20 and into compressor section 15. Compressor section 15 includes a compressor housing 16 with a compressor wheel 17 positioned within the compressor housing and mounted on an opposite end of shaft 40, spaced from the turbine section 12. The compressor housing 16 and the compressor wheel 17 define a gas flow path through which a gas enters the compressor and is compressed. A flinger sleeve 42 is located on shaft 40 and rotates along with the turbine wheel 14 and the compressor wheel 17 as shaft 40 rotates.

Central bearing section 20 has a central bearing housing 21 with a central bore 22. A bearing chamber 23 within central bearing housing 21 has a bearing assembly 24 therein configured to support shaft 40 for rotational movement therein. Bearing assembly 24 includes a pair of spaced apart bearings 25 although other numbers of bearing could be used. As depicted, the bearings are ball bearings but other types of bearings such as journal bearings may also be used.

A lubrication system 50 is provided for supplying a lubricant such as oil through an inlet 52 in central bearing housing 21 and into a lubricant or oil passage 53 that is in fluid communication with the bearing chamber 23. The lubrication system 50 circulates oil within the bearing chamber and to the bearing assembly 24 and each bearing 25. Oil collects in the collection sump 54 and exits the central bearing housing 21. Oil is subsequently re-routed through the lubrication system 50. The lubrication system may be a component of or in fluid communication with the engine lubrication system (not shown) or function as a separate system. Oil that moves towards compressor section 15 wets the flinger sleeve 42 and is propelled from the larger diameter portion 43 of the flinger sleeve 42 into an annularly shaped flinger recess 26 when the flinger sleeve 42 is rotating. Oil flung from the flinger sleeve 42 subsequently collects within collection sump 54.

A first seal 35 is positioned along and engages shaft 40 adjacent a side of the bearing chamber. The first seal 35 provides sealing between the shaft 40 and central bearing housing 21 to limit oil that travels or migrates past the flinger sleeve 42 from leaking along the shaft 40. A second seal 36, spaced from the first seal 35, is positioned along and engages shaft 40 between the first seal 25 and the compressor wheel 17 to further limit any oil from traveling towards the compressor section 15. An annularly shaped recess 28 is positioned along, extends peripherally around, and is in fluid communication with central bore 22 in the central bearing housing 21 between the first seal 35 and the second seal 36 to define an air buffer chamber 27. A bore 29 extends through the central bearing housing 21 to fluidly connect annularly shaped recess 28 with an air supply for supplying compressed or pressurized air that has a pressure greater than the air pressure within bearing chamber 23. The air buffer chamber 27 supplies or provides pressurized air to an outer side of the first seal 35 that faces the second seal 36 and to an inner side of the second seal that faces the first seal. Examples of air supplies may include compressed air exiting from the compressor section 15 through a duct 30 or an auxiliary air supply such as an auxiliary compressor 31 or an air reservoir 32 that stores compressed air.

By providing pressurized air within the annularly shaped recess 28 that has a greater pressure than the pressure within the bearing chamber 23, a pressure differential is created between the air buffer chamber 27 and the bearing chamber 23. This pressure differential creates an air buffer seal that will reduce the likelihood of any oil flowing past the first seal 35 and thus reduce the likelihood of oil leaking into the compressor section 15. In some circumstances, a small quantity of air may move past the first seal 35 and into the bearing chamber. The pressure differential will further reduce the likelihood of oil flowing past the first seal 35 and thus reduce the likelihood of oil entering the compressor section 15. As depicted, a similar arrangement of seals and an annularly shaped recess is provided along the opposite side of the bearing chamber 23 between the bearing chamber and the turbine section 12. Other types of sealing structures may be provided to reduce the likelihood that oil will flow past the first seal 35 adjacent the turbine section 12 and thus reduce the likelihood that oil will leak into the turbine section.

Figure 3:
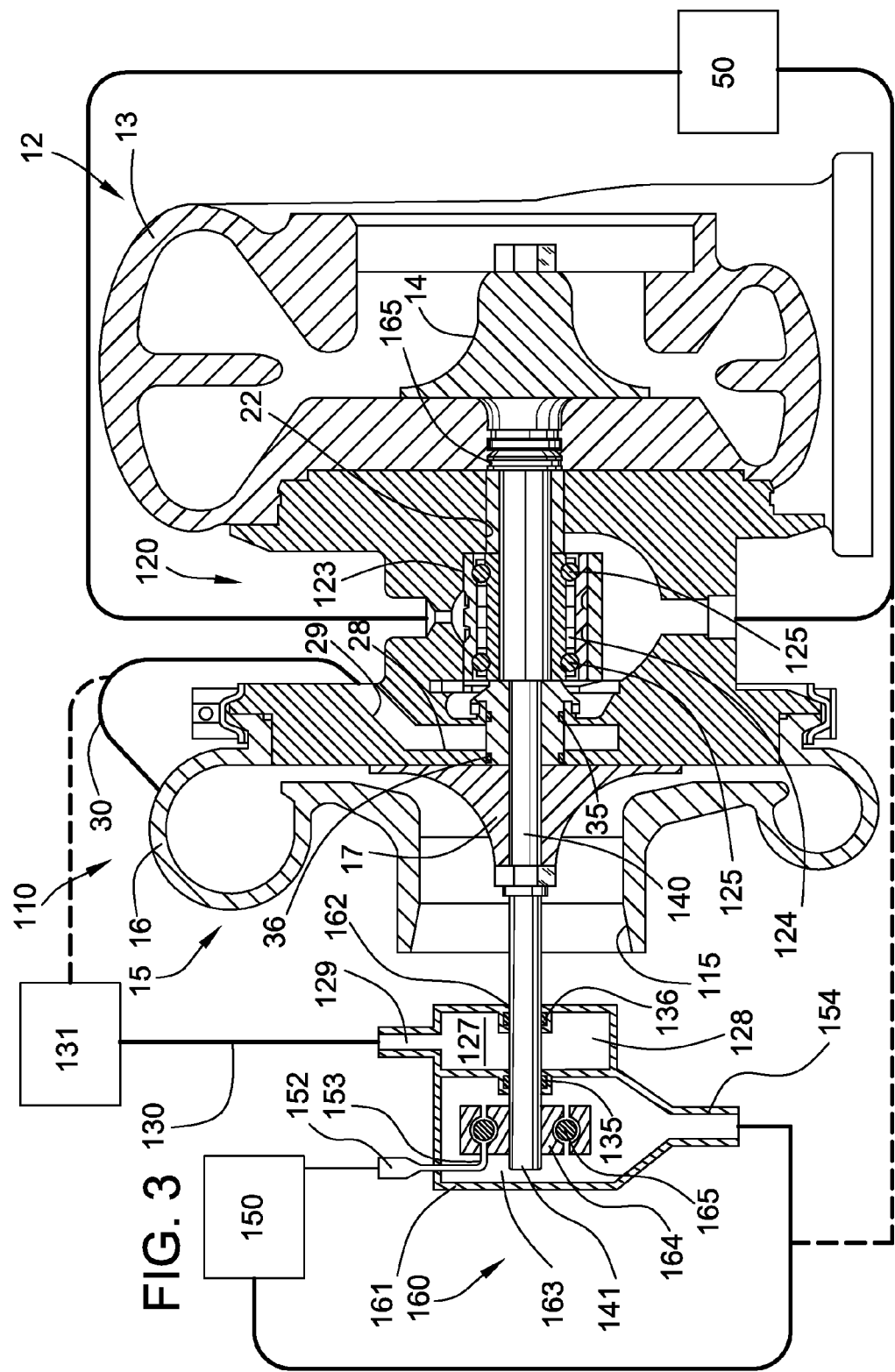
FIG. 3 is an alternate embodiment of a turbocharger, partially in section, in accordance with the disclosure.

Referring to FIG. 3, an alternate embodiment of a turbocharger 110 is depicted. Identical or similar elements are depicted with identical reference numbers for the sake of brevity. In turbocharger 110, a remote end 141 of shaft 140 extends substantially past compressor wheel 17 and is supported by a remote bearing section 160 positioned in line with or upstream of the compressor wheel 17 and adjacent inlet 115 of compressor housing 16. Remote bearing section 160 has a remote bearing housing 161 with a central bore 162. A remote bearing chamber 163 within remote bearing housing 161 has a remote bearing assembly 164 therein configured to support the remote end 141 of shaft 140 for rotational movement therein. As depicted, the remote bearing assembly 164 includes a set of ball bearings 165 but other types of bearings such as journal bearings may also be used.

A remote lubrication system 150 is provided for supplying a lubricant such as oil through an inlet 152 in remote bearing housing 161. Oil from the inlet 152 is provided to a remote oil passage 153 that is in fluid communication with the remote bearing chamber 163 to circulate oil within the remote bearing chamber and to the remote bearing assembly 164 and the bearings thereof. Oil collects in the remote collection sump 154 and exits the remote bearing housing 161 to be re-routed through the remote lubrication system 150. Remote lubrication system 150 may be in fluid communication with or a component of lubrication system 50, if desired.

A first remote seal 135 is positioned along shaft 140 and adjacent a side of the remote bearing chamber 163. The first remote seal 135 provides sealing between the shaft 140 and remote bearing housing 161 to limit any oil that travels or migrates from the remote bearing chamber towards the compressor wheel 17. A second remote seal 136, spaced from the first remote seal 135, is positioned along and engages shaft 140 between the first remote seal and the compressor wheel 17 to further limit any oil from traveling towards the compressor section 15. An annularly shaped remote recess 128 is positioned along and is in fluid communication with central bore 162 in the remote bearing housing 161 between the first remote seal 135 and the second remote seal 136. The annularly shaped remote recess 128 defines a remote air buffer chamber 127. A bore 129 extends through the remote bearing housing 161 to fluidly connect annularly shaped remote recess 128 with a duct 130 fluidly connected to a remote air supply 131. The remote air supply 131 is configured to supply air having a pressure greater than the air pressure within remote bearing chamber 163 to the remote air buffer chamber 127. The remote air buffer chamber supplies or provides pressurized air to a side of the first remote seal 135 that faces the second remote seal 136 and to a side of the second remote seal that faces the first remote seal. Remote air supply 131 may take various forms such as compressed air from compressor section 15, an auxiliary compressor 31 or an air reservoir 32. If desired, remote air supply 131 may form a component of or be fluidly connected to the air supply that provides compressed air to annularly shaped recess 28.

By providing pressurized air within the annularly shaped remote recess 128 that has a greater pressure than the pressure within the remote bearing chamber 163, a pressure differential is created between the air buffer chamber and the bearing chamber. This pressure differential creates an air buffer seal that will reduce the likelihood of oil leaking past the first remote seal 135 and thus reduce the likelihood of oil entering the compressor section 15.

In addition to remote bearing assembly 164, shaft 140 of turbocharger 110 is also supported within central bearing section 120 located between turbine section 12 and compressor section 15. Due to the additional support provided by remote bearing section 160 and remote bearing assembly 164, the bearing assembly 124 supporting shaft 140 within central bearing section 120 may be smaller or shorter along the axis of shaft 140. As a result, the axial length of central bearing section 120 may be smaller or shorter if desired. As depicted, central bearing section 120 includes a bearing assembly 124 with two bearings 125 that are spaced more closely together than those in the embodiment of FIG. 1. As depicted, the sealing structure between the bearing chamber 123 and the compressor section 15 is identical to that depicted in FIG. 1. The sealing structure between the bearing chamber 123 and the turbine section 12 is depicted as a series of seals 165 without an air buffer chamber. If desired, the seal structures at both ends of the bearing chamber 123 may be identically configured, either with or without the air buffer chamber.

Due to the additional support provided by remote bearing section 160, under some conditions, it may be possible to use a larger compressor housing and compressor wheel in order to provide greater performance without increasing the instability of the rotating assembly. Further, the additional support provided by the remote bearing section 160 may permit the elimination of one of the bearings 25 from the bearing assembly 124 and thus reduce the axial length of central bearing section 120.

In some applications, the structure disclosed herein may be used with other forced inductions systems such as, for example, a supercharger (not shown). In a supercharger, rather than having a turbine section that uses exhaust gas to rotate a shaft and compressor, the shaft and compressor are directly connected to and driven by the engine through the use of a belt (not shown) or some other similar device. In other words, superchargers and turbochargers each include a shaft and compressor but have different types of drive sections to provide the rotational force to the shaft and compressor. The features disclosed herein may be used with a supercharger to isolate a lubricant such as oil from the compressor section.

INDUSTRIAL APPLICABILITY

The industrial applicability of the system described herein will be readily appreciated from the foregoing discussion. The present disclosure is applicable to many types of forced induction systems including turbochargers and, in some applications, superchargers. It is desirable to prevent or reduce the likelihood that oil used for lubricating bearings 25 that support the shaft 40 of the turbocharger 10 will travel or migrate past seals 35 that engage the shaft 40.

In one aspect, a turbocharger 10 includes a turbine section 12 with a turbine wheel 14, a compressor section 15 with a compressor wheel 17 and a bearing section 20. The turbine wheel 14 and the compressor wheel 17 are mounted on the shaft 40. The shaft 40 is rotatably mounted in a central bore 22 of a housing. The bearing section 20 has a bearing chamber 23 with a bearing assembly 24 and the bearing assembly rotatably supports the shaft 40. A lubrication system 50 includes a lubricant or oil passage 53 for circulating a lubricant such as oil within the bearing chamber 23 and to the bearing assembly 24. A first seal 35 is positioned along the shaft 40 adjacent a side of the bearing chamber 23 and a second seal 36 is positioned along the shaft and spaced from the first seal. A recess 28 is positioned between the first seal 35 and the second seal 36 to define an air buffer chamber. The air buffer chamber is in fluid communication with an air supply to provide the air buffer chamber with a supply of pressurized air to create a pressure differential between the bearing chamber 23 and the air buffer chamber. The pressure differential discourages or reduces the likelihood of lubricant leakage past the first seal 35. The air supply may take a variety of forms including compressed air from the compressor section 15 of the turbocharger, an auxiliary compressor 31 as well as a vessel or air reservoir 32 that stores compressed air.

In another aspect, the turbocharger 110 includes a turbine section 12 with a turbine wheel 14, a compressor section 15 with a compressor wheel 17 and a bearing section 120. The turbine wheel 14 and the compressor wheel 17 are mounted on a shaft 140 and the shaft is rotatably mounted in a bore of a housing. The bearing section 120 has a bearing chamber 123 with a bearing assembly 124. The bearing assembly 124 rotatably supports the shaft. A lubrication system 50 includes a lubricant or oil passage 53 for circulating a lubricant such as oil within the bearing chamber 123 and to the bearing assembly 124. The shaft 140 includes a remote end 141 with a remote bearing chamber 163 positioned adjacent the remote end of the shaft. The remote bearing chamber 163 has a remote bearing assembly 164 rotatably supporting the remote end 141 of the shaft 140. A remote lubrication system 150 includes a remote oil passage 153 for circulating a lubricant such as oil within the remote bearing chamber 163 to the remote bearing assembly 164. A first remote seal 135 is positioned along the shaft 140 adjacent a side of the remote bearing chamber 163 and a second remote seal 136 is positioned along the shaft and spaced from the first seal. A remote recess 128 is positioned between the first remote seal 135 and the second remote seal 136 to define a remote air buffer chamber. The remote air buffer chamber is in fluid communication with a remote air supply 130 to provide the remote air buffer chamber with a supply of pressurized air to create a pressure differential between the remote bearing chamber 163 and the remote air buffer chamber to reduce the likelihood of lubricant leakage past the first remote seal 135. The support provided by the bearing section 120 and the remote bearing section 160 increases the stability of the shaft 140 and facilitates the use of a larger compressor housing 16 and compressor wheel 17 which, in turn, permits greater performance of the turbocharger. In addition, the additional support provided by the remote bearing section 160 may permit the elimination of one of the bearings 25 from the bearing assembly 124 or the reduction in the space between the bearings 25 and thus permit a reduction in the axial length of central bearing section 120. The air buffer chamber may also be implemented with other forced induction systems such as a supercharger.

During the course of operating an engine and turbocharger 10, pressurized air is supplied from an air supply 30 to annularly shaped recess 28 so that the pressure within the annularly shaped recess is greater than the pressure of the oil within the bearing chamber 23. As the shaft 40 of turbocharger 10 rotates, oil is supplied through the lubrication system 50 through oil passage 53 in central bearing housing 21 of central bearing section 20 to lubricate bearings 25 of bearing assembly 24. The pressure differential between the annularly shaped recesses 28 and the bearing chamber 23 will reduce the likelihood that oil will pass or migrate out of the bearing chamber. Depending on the magnitude of the pressure differential between the annularly shaped recess 28 and the bearing chamber 23, a small quantity of air may pass from the recess past the first seal 35 and into the bearing chamber 23. Since the flow of air is in a direction opposite the direction that oil from the bearing chamber 23 must flow to reach either the turbine section 12 or the compressor section 15, the flow of air will further reduce the likelihood that any oil will reach either the turbine section or the compressor section.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A turbocharger, comprising:
   a turbine section with a turbine wheel;
   a compressor section with a compressor wheel;
   the turbine wheel and the compressor wheel being mounted on a shaft;
   a housing having a bore with the shaft rotatably mounted in the bore, the housing including a turbine housing with the turbine wheel positioned therein, a compressor housing with the compressor wheel positioned therein, a central bearing housing being positioned between the turbine housing and the compressor housing;
   a bearing section between the turbine section and the compressor section having a bearing chamber with a bearing assembly therein, the bearing assembly being positioned within the central bearing housing, the bearing assembly rotatably supporting the shaft in the housing, the bearing chamber having a pair of spaced apart opposite sides, a first side being generally adjacent the turbine section and a second side being generally adjacent the compressor section;
   a lubrication system including a lubricant passage for circulating lubricant within the bearing chamber and to the bearing assembly; and
   a seal assembly positioned at each side of the bearing chamber, each seal assembly including:
   a first seal positioned along the shaft adjacent a side of the bearing chamber,
   a second seal positioned along the shaft and spaced from the first seal, and
   a recess between the first seal and the second seal, the recess defining an air buffer chamber, the air buffer chamber being in fluid communication with an air supply to provide the air buffer chamber with a supply of pressurized air to create a pressure differential between the bearing chamber and the air buffer chamber that discourages lubricant leakage past the first seal;
   wherein the shaft includes a remote end, the compressor wheel is positioned between the remote end and the bearing assembly, the remote end of the shaft is rotatably supported by a remote bearing assembly positioned within a remote bearing chamber adjacent the remote end, a first remote seal is positioned along the shaft adjacent the remote end of the shaft and adjacent a side of the remote bearing assembly, a second remote seal is positioned along the shaft and spaced from the first remote seal, and a remote recess between the first remote seal and the second remote seal defines a remote air buffer chamber, the remote air buffer chamber is in fluid communication with a remote air supply to provide the remote air buffer chamber with a supply of pressurized air to create a pressure differential between the remote bearing chamber and the remote air buffer chamber to discourage lubricant leakage past the first remote seal.

2. The turbocharger of claim 1, wherein the air supply includes a duct supplying compressed air from the compressor section to the air buffer chamber.

3. The turbocharger of claim 1, wherein the air supply includes an auxiliary compressor supplying compressed air to the air buffer chamber.

4. The turbocharger of claim 1, wherein the air supply includes an air reservoir supplying compressed air to the air buffer chamber.

5. The turbocharger of claim 1, wherein the recess between the first seal and the second seal is annularly shaped and extends peripherally around the shaft.

6. The turbocharger of claim 1, wherein the air buffer chamber provides pressurized air to a side of the first seal facing the second seal and to a side of the second seal facing the first seal.

7. The turbocharger of claim 1, further including a duct fluidly connecting the air supply and the air buffer chamber, the duct including a bore formed in the housing.

8. The turbocharger of claim 1, wherein the bearing assembly includes a pair of spaced apart bearings.

9. A turbocharger, comprising:
   a turbine housing;
   a compressor housing;
   a central bearing housing positioned between the turbine housing and the compressor housing;
   a shaft rotatably mounted within a bore in the central bearing housing, the shaft having a remote end;
   a turbine with a turbine wheel mounted on the shaft and being positioned within the turbine housing, the turbine housing and the turbine wheel defining an exhaust flow path through which exhaust gas enters the turbine and rotates the turbine wheel;
   a compressor with a compressor wheel mounted on the shaft between the remote end and the turbine wheel and being positioned within the compressor housing, the compressor being positioned between the remote end of the shaft and the central bearing housing, the compressor housing and the compressor wheel defining a gas flow path through which a gas enters the compressor and is compressed;
   a bearing chamber with a bearing assembly therein positioned within the central bearing housing, the bearing assembly rotatably supporting the shaft between the turbine wheel and the compressor wheel;
   a lubrication system including a passage for circulating lubricant through the bearing assembly;
   a remote bearing chamber positioned adjacent the remote end of the shaft, the remote bearing chamber having a remote bearing assembly therein rotatably supporting the remote end of the shaft;
   a remote lubrication system including a remote lubricant passage for circulating lubricant within the remote bearing chamber to the remote bearing assembly;

a first remote seal positioned along the shaft adjacent a side of the remote bearing chamber;

a second remote seal positioned along the shaft and spaced from the first remote seal; and a remote recess between the first remote seal and the second remote seal to define a remote air buffer chamber, the remote air buffer chamber being in fluid communication with a remote air supply to provide the remote air buffer chamber with a supply of pressurized air to create a pressure differential between the remote bearing chamber and the remote air buffer chamber to discourage lubricant leakage past the first remote seal.

10. The turbocharger of claim 9, wherein the remote air supply includes a remote duct supplying compressed air from the compressor to the remote air buffer chamber.

11. The turbocharger of claim 9, wherein the remote air supply includes an auxiliary compressor supplying compressed air to the remote air buffer chamber.

12. The turbocharger of claim 9, wherein the remote air supply includes an air reservoir supplying compressed air to the remote air buffer chamber.

13. The turbocharger of claim 9, wherein the remote recess between the first remote seal and the second remote seal is annularly shaped and extends peripherally around the shaft.

14. The turbocharger of claim 9, wherein the remote air buffer chamber provides pressurized air to a side of the first remote seal facing the second remote seal and to a side of the second remote seal facing the first remote seal.

15. The turbocharger of claim 9, wherein the remote bearing chamber is positioned adjacent an air inlet for the compressor.

16. The turbocharger of claim 9, further including an annularly shaped recess between a first seal adjacent the bearing chamber and a second seal.

17. A forced induction system, comprising:

a drive section;

a compressor section with a compressor wheel;

the compressor wheel being mounted on a shaft;

a housing having a bore with the shaft rotatably mounted in the bore;

a bearing section having a bearing chamber with a bearing assembly therein, the bearing assembly rotatably supporting the shaft in the housing, the bearing section being positioned adjacent an end of the shaft and adjacent the compressor section;

a lubrication system including a lubricant passage for circulating lubricant within the bearing chamber and to the bearing assembly; and a first seal positioned along the shaft adjacent a side of the bearing chamber;

a second seal positioned along the shaft and spaced from the first seal;

a recess between the first seal and the second seal, the recess defining an air buffer chamber, the air buffer chamber being in fluid communication with an air supply to provide the air buffer chamber with a supply of pressurized air to create a pressure differential between the bearing chamber and the air buffer chamber that discourages lubricant leakage past the first seal.

* * * * *